US008635654B2

(12) United States Patent
Correa et al.

(10) Patent No.: US 8,635,654 B2
(45) Date of Patent: Jan. 21, 2014

(54) WIRELESS AUDIO DISTRIBUTION SYSTEM AND METHOD FOR AN IN-FLIGHT ENTERTAINMENT SYSTEM

(75) Inventors: Paulo Correa, Laguna Niguel, CA (US); Kenneth A. Brady, Jr., Trabuco Canyon, CA (US); Gary Vanyek, Laguna Niguel, CA (US); V. Ian McClelland, Irvine, CA (US); Arnaud Heydler, Newport Beach, CA (US); Harmon F. Law, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 771 days.

(21) Appl. No.: 12/110,487

(22) Filed: Apr. 28, 2008

(65) Prior Publication Data

US 2009/0007193 A1 Jan. 1, 2009

Related U.S. Application Data

(60) Provisional application No. 60/924,102, filed on Apr. 30, 2007, provisional application No. 60/924,103, filed on Apr. 3, 2007.

(51) Int. Cl.
*H04N 7/18* (2006.01)
*H04N 21/214* (2011.01)

(52) U.S. Cl.
CPC .................................. *H04N 21/2146* (2013.01)
USPC .......................................................... 725/76

(58) Field of Classification Search
USPC ..................................................... 725/74–77
See application file for complete search history.

(56) References Cited

U.S. PATENT DOCUMENTS

| | | | |
|---|---|---|---|
| 5,771,438 A * | 6/1998 | Palermo et al. ............... | 455/41.1 |
| 6,262,978 B1 | 7/2001 | Bruno et al. | |
| 7,346,917 B2 * | 3/2008 | Gatto et al. ........................ | 725/5 |
| 2002/0068610 A1 | 6/2002 | Anvekar et al. | |
| 2002/0097718 A1 | 7/2002 | Korus et al. | |
| 2003/0037125 A1 | 2/2003 | Luman et al. | |
| 2004/0073932 A1 * | 4/2004 | Lavelle et al. .................. | 725/75 |
| 2004/0117503 A1 | 6/2004 | Nguyen et al. | |
| 2004/0125958 A1 | 7/2004 | Brewster et al. | |
| 2004/0220862 A1 * | 11/2004 | Jackson .......................... | 705/26 |
| 2005/0102697 A1 | 5/2005 | Vitito | |

(Continued)

FOREIGN PATENT DOCUMENTS

WO WO 2006/026398 A2 3/2006

OTHER PUBLICATIONS

"Audio" webpage. Jun. 18, 2003. http://web.archive.org/web/20030618040446/http://www.mpeg.org/MPEG/DVD/Book_B/Audio.html.*

(Continued)

*Primary Examiner* — Bennett Ingvoldstad
(74) *Attorney, Agent, or Firm* — Myers Bigel Sibley & Sajovec, P.A.

(57) ABSTRACT

A wireless communication system for a vehicle includes a seat or overhead video display unit, a control and audio unit that is associated with and located remotely with respect to the video display unit, a first wireless transceiver associated with the video display unit, a second wireless transceiver associated with the control and audio unit, where the first and second wireless transceivers are linked together for communication. The video display unit receives audiovisual content and splits audio content for transmission to the control unit. The control unit can similarly transmit control and selection information to the video display unit.

8 Claims, 7 Drawing Sheets

(56) References Cited

U.S. PATENT DOCUMENTS

| | | | |
|---|---|---|---|
| 2005/0216938 A1* | 9/2005 | Brady et al. | 725/76 |
| 2005/0268319 A1* | 12/2005 | Brady, Jr. | 725/76 |
| 2005/0278754 A1 | 12/2005 | Bleacher et al. | |
| 2006/0029065 A1 | 2/2006 | Fellman | |
| 2006/0062400 A1 | 3/2006 | Chia-Chun | |
| 2007/0124777 A1* | 5/2007 | Bennett et al. | 725/78 |
| 2007/0250873 A1* | 10/2007 | Ohyama et al. | 725/82 |
| 2008/0181435 A1* | 7/2008 | Ozaki et al. | 381/107 |
| 2009/0029743 A9* | 1/2009 | Lair et al. | 455/569.1 |
| 2010/0186051 A1* | 7/2010 | vonDoenhoff et al. | 725/76 |

OTHER PUBLICATIONS

"Wireless Sensor Network Topologies" webpage. Manges, Wayne. May 1, 2000. http://www.sensorsmag.com/networking-communications/wireless-sensor-network-topologies-778.*

Bluetooth Specification version 1.2 (Relevant Sections). Nov. 5, 2003. Full document at http://netlab.cs.ucla.edu/wiki/files/btv12.pdf.*

European Search Report Corresponding to European Patent Application No. 08746999.5; Dated: Apr. 5, 2013; 5 Pages.

* cited by examiner

WIRELESS AUDIO DISTRIBUTION SYSTEM AND METHOD FOR AN IN-FLIGHT ENTERTAINMENT SYSTEM

CROSS REFERENCE TO RELATED APPLICATIONS

The present application claims the benefit of U.S. Provisional Application No. 60/924,103, and U.S. Provisional Application No. 60/924,102, both filed Apr. 30, 2007, and both herein incorporated by reference.

BACKGROUND

The present invention relates to a system and method for providing in-flight entertainment (IFE) throughout a cabin of a vehicle, such as an aircraft. More particularly, the present invention relates to a system and method for providing an IFE system that includes a network of wireless two way communications between a seat arm and a seat video display unit (SVDU).

A disadvantage of IFE systems is that an audio program that is decoded for a particular video display cannot be presented through an associated loud speaker since each passenger may be watching a different program or may be watching at different times, particularly for video on-demand applications. The result is impractical. Thus, a related IFE uses an earphone corresponding a video display. However, plugging an earphone into an audio jack that is located on a video display is problematic because a wire hanging in front of the passenger is undesirable, since it may interfere with other activities of the passenger or, for any seat other than the window seat, may interfere with exit and entry activities of other passengers. For some related IFE systems, one solution is to provide the audio jack and the audio controls in an arm of a passenger seat.

It is believed that, with audio codecs and a digital audio system, the audio control and delivery of audio content may be transferred from the seat arm to the video display using the same cabling system that transmits content from the servers to the passengers and that transmits requests and control from the passenger to the servers or head-end. Accordingly, no audio cable would be used. However, other arrangements for delivering audio content are desirable.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain features of the invention.

DETAILED DESCRIPTION OF THE EMBODIMENTS OF THE INVENTION

Embodiments of the present invention provide an IFE system that employs a network of wireless two way communications between a seat arm and a seat video display.
Cabin Layout and IFE Background The IFE system is capable of presenting video and associated audio to multiple presentation devices, such as multiple video players and multiple audio headsets in an IFE system in a vehicle. This environment is typically an airplane, train, bus, boat, ship, or other multi-passenger vehicle where there are multiple overhead video monitors being viewed by multiple passengers who listen to the audio associated to the overhead video program through a headset plugged into an audio jack local to the passenger's seat. The IFE system is thus capable of providing audio and/or visual content to a large number of locations in the vehicle cabin.

Figure 1A:
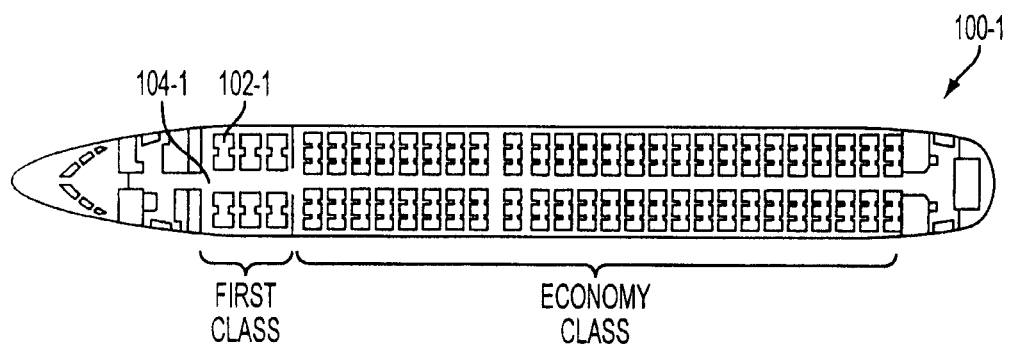
FIGS. 1A and 1B are pictorial diagrams illustrating examples of seating layouts for commercial aircraft in which an embodiment of the present invention may be employed.
Figure 1B:
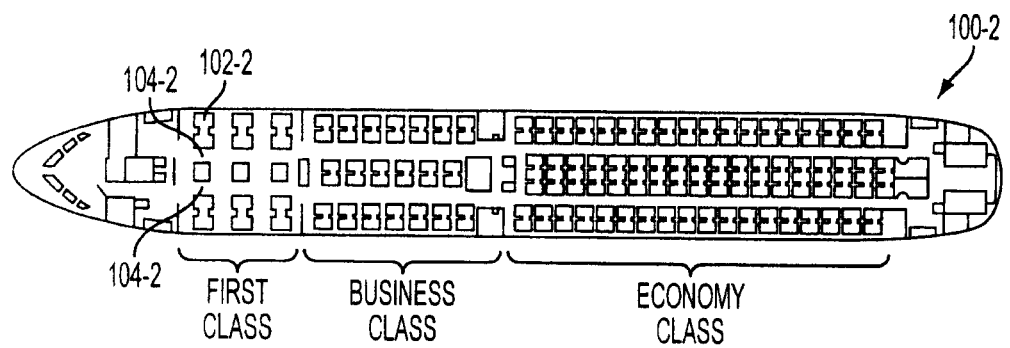
Figure 2:
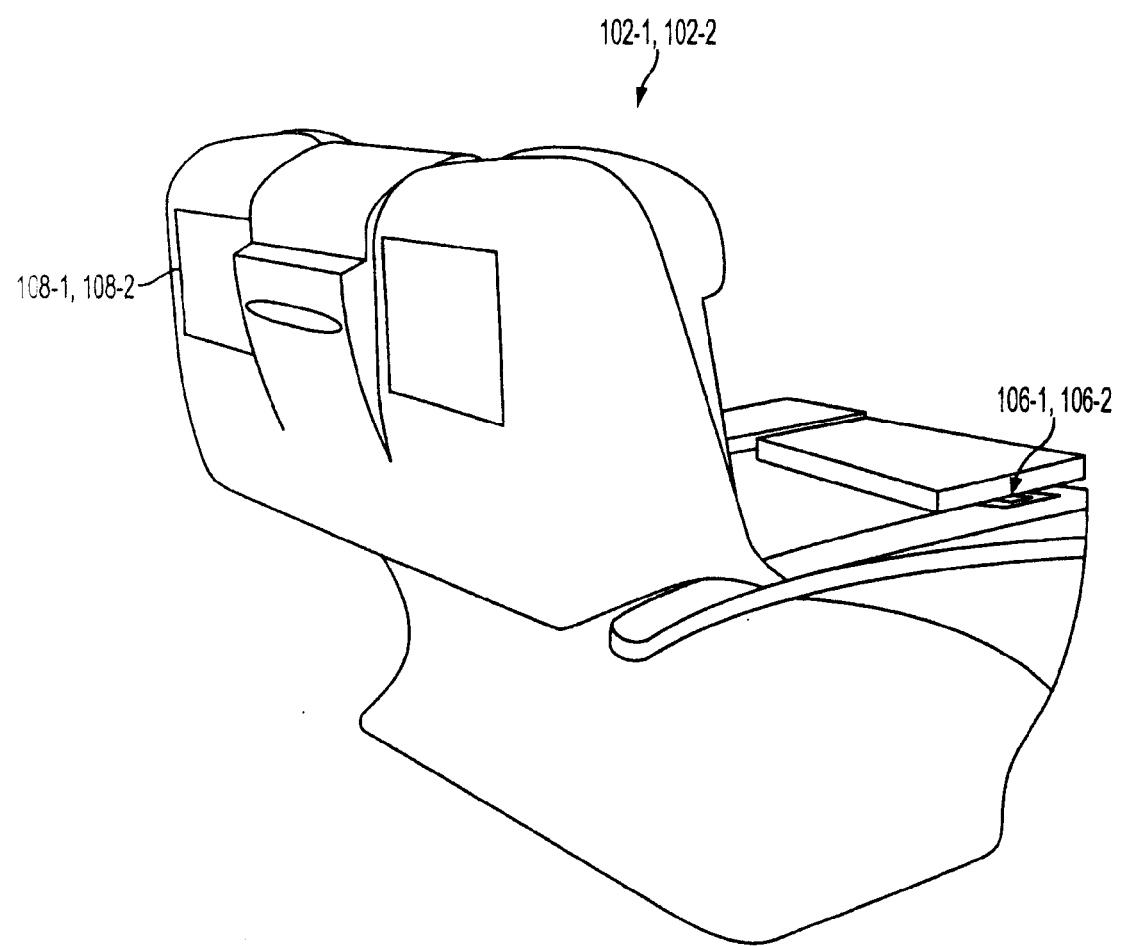
FIG. 2 is a pictorial diagram illustrating an example of an in-seat video player arrangement for the commercial aircraft as shown in FIGS. 1A and 1B.

FIGS. 1A and 1B illustrate examples of typical seating arrangements for two different aircraft 100-1 and 100-2. As shown, the environment of an IFE system for the aircraft 100-1 or 100-2 includes a densely packed population of passenger seats 102-1 or 102-2 (hereinafter generically referred to as a seat or seats 102) organized into rows and columns. Seats are typically organized into groups of from 2 to 4 side-by-side seats, and seat groups are placed into long rows running between the front and back of the aircraft. Short distance aircraft 100-1 typically have two rows of seat groups with the center aisle 104-1 for access. Longer distance aircraft 100-2 typically have three rows of seat groups with two aisles 104-2 for access. As shown in FIG. 2, each passenger seat 102 is provided with a headset jack 106-1 or 106-2 (hereinafter generically referred to as headset jack or jacks 106) into which an audio headset can be plugged.

Entertainment audio is typically presented to each passenger over their respective headset. Entertainment video is typically presented to passengers in two different ways, either via overhead video monitor 124 (see FIG. 3) or via an in-seat video player 108-1 or 108-2 (see FIG. 2). In the overhead video arrangement, an aircraft 100-1 or 100-2 is fitted with a number of overhead video monitors 124 to which a video program can be supplied. Overhead video systems have evolved from those which provided a single video projector in each class of the aircraft cabin to current systems which provide a large number of individual monitors hung from the ceiling or baggage bins. In current systems, each passenger can choose to watch the overhead monitor most convenient for their personal viewing.

In the in-seat video player arrangement, the aircraft 100-1 or 100-2 is equipped with individual video players 108-1 or 108-2 (hereinafter generically referred to as a video player or players 108) for each passenger seat 102, as shown in FIG. 2, which provides each passenger with an individualized entertainment experience. It is common to combine both types of video presentation into an aircraft, and it is also common to differentiate service to different passenger classes (e.g., in-seat video for first and business classes, and overhead video in economy class). In either case, the overhead video monitors and in-seat video players 108 communicate with an IFE system 110 as shown in FIG. 3.

Figure 3:
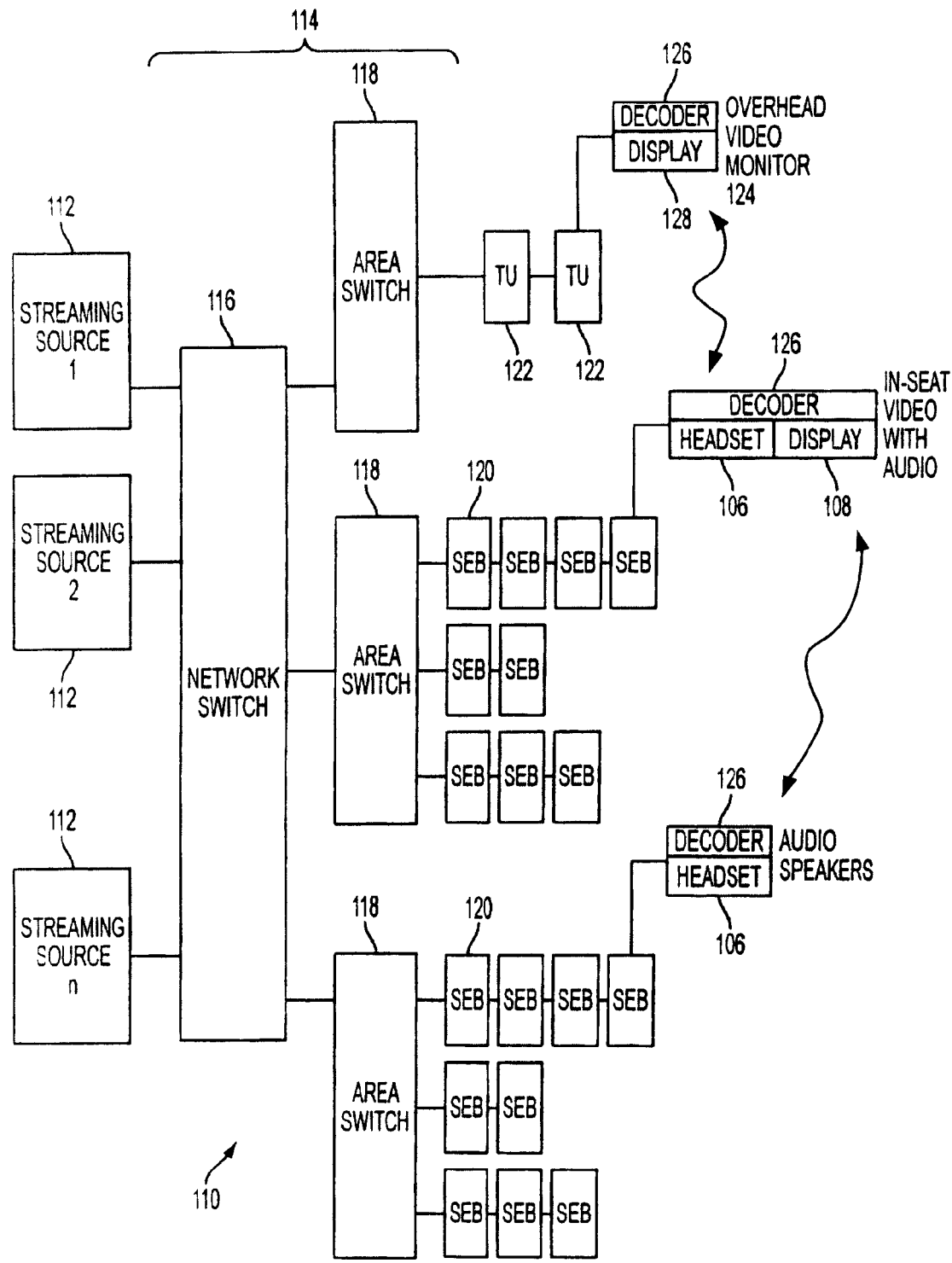
FIG. 3 is a block diagram illustrating an example of an IFE system employed in an aircraft as shown in FIGS. 1A and 1B and which may employ an embodiment of the present invention.

An example of the physical architecture of the digital network in a typical IFE system 110 is further illustrated in FIG. 3. The basic components are a set of head end streaming sources 112, a distribution network 114 that can include one or more network switches 116 and a plurality of area switches 118, and columns of seat components such as seat electronic boxes (SEBs) 120 and tapping units 122. The streaming sources 112 may be digital servers (e.g., preloaded with MPEG digital content) or may be real-time encoders capable of converting input video and audio into MPEG data. The network switch 116 can be, for example, a layer 2 or layer 3 Ethernet switch, and is configured to connect any of the streaming sources 112 to any component of the IFE system 110 of the aircraft. An area switch 118 is provided in each area of the aircraft 100-1 or 100-2 to connect the network switch 116 to multiple columns of seats. In this example, each area switch 118 connects to three seat columns, but the number of seat columns to which an area switch 118 connects can vary as desired.

Each seat group as discussed above is fitted with an SEB 120, and the components at the seats 102, such as the video players 108 and headset jacks 106, are wired from an area switch 118 through a number of SEBs 120 arranged in a seat column. As can be appreciated by one skilled in the art, an SEB 120 extracts data packets intended for locally attached players (decoders) and passes other packets through to the next SEB 120 in the seat column as required.

As further shown in FIG. 3, each overhead monitor 124 typically includes or is associated with a decoder 126 and a display 128. The overhead monitors 124 are, in this exemplary arrangement, connected to the IFE system 110 through a set of tapping units (TU) 122 that perform the same or similar functions as the SEBs 120. As also shown, each headset jack 106, and in-seat video player 108, includes or is associated with a decoder 126 that is connected to an SEB 120 as discussed above.

Many IFE systems 110 have multiple video programs stored on a streaming source 112. When playback is desired, a video player (e.g., video player 108 or overhead monitor 124) obtains the material from the streaming source 112 and decodes the compressed content into a presentable form. If the material is to be presented on overhead monitors 124 or in a video announcement that is to be simultaneously viewed by all passengers, the material typically can be decoded by a single player and distributed to all monitors using an analog distribution technique, e.g., through RF modulation or baseband distribution technologies. If the material is to be presented to a passenger on an individual basis (e.g., Video on Demand) then the passenger has a dedicated player (e.g., a video monitor 108), which can obtain a compressed digital program and decode it specifically for the passenger.

To support a broadcast program, a streaming source 112 would typically transmit a digital stream throughout the digital network of the IFE system 110 using a network protocol appropriate for a one-to-many relationship. As can be appreciated by one skilled in the art, typically TCP/IP communications can be used for one-to-one communications. Also, a one-to-many network protocol, commonly referred to as a "multi-cast," can be combined with a fixed rate streaming protocol such as a Real-Time Protocol (RTP).

As can further be appreciated by one skilled in the art, multicast on an IP network typically assigns each multicast program a specific multicast IP address. The streaming source 112 can then transmit the program onto the network (e.g., using RTP) with, for example, a broadcast layer 2 address and the assigned multicast layer 3 address. The network of the IFE system 110 can make this stream available to all network devices, such as video player 108 and overhead monitors 124. A player (e.g., video player 108) can present this program by "subscribing" to the program using the IGMP protocol specifying the desired multicast IP address. This process permits the streaming source to transmit a single data stream and have it received by all desired players on the network.

The example of the data network architecture described above with regard to FIG. 3 enables a streaming source 112 to produce a single packetized video/audio stream which is available to all desired video players 108 and overhead monitors 124 in the aircraft 100-1 or 100-2. This arrangement allows for a personal, in-seat presentation of a common source program to requesting passengers.

Separation of Audio Signal and Wireless Transmission

Figure 4:
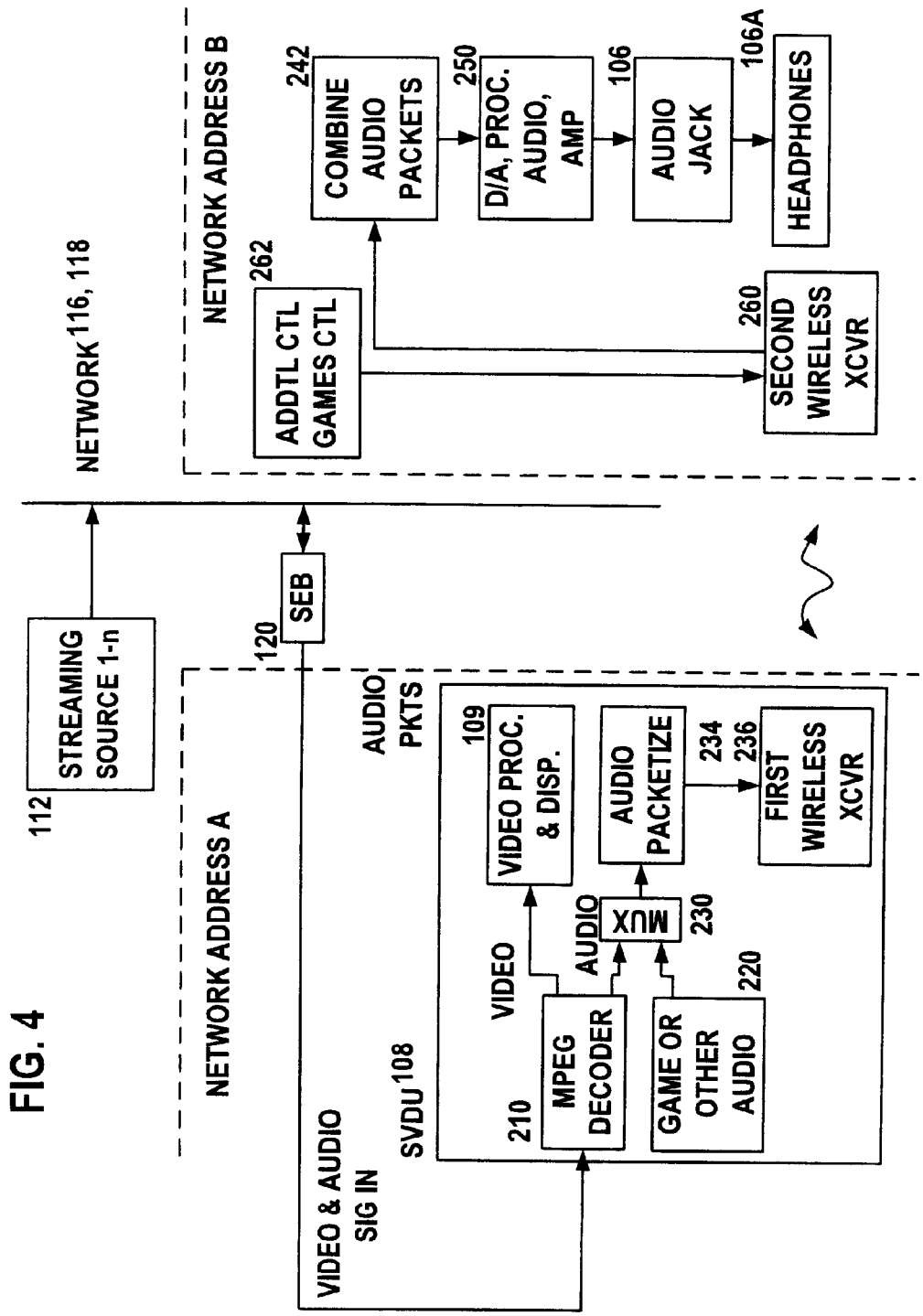
FIG. 4 is a block diagram illustrating an embodiment according to the present invention including a wireless connection between a video display unit at a first address and a seat arm connection at a second address.

Referring to FIG. 4, a seat video display unit (SVDU) 200 includes an MPEG decoder that includes an audio decoder and pulse-code modulator 210 for decoding the audio and maintaining synchronization with the corresponding video. The recovered audio is transformed into a digital format with low latency, e.g., a pulse-code modulated (PCM) uncompressed digital format. The digitally formatted audio signal is transmitted by a first wireless transceiver 236 to a second wireless transceiver 260 located, e.g., in a seat arm (although this second wireless transceiver 260, along with other hardware and software associated with audio and selection and control elements, could be located anywhere within the seat or seat group the sound engineering principles might suggest. As an example, the wireless transceivers 236, 260 may use an ultra-wide band (UWB) standard, such as WiMedia Alliance's Ultra-WideBand platform, but alternative standards, such as Bluetooth, wireless USB, Wi Fi and variations of the IEEE 802.11 group of specifications, infrared, and others may be used to communicate with the seat arm.

The seat arm device works in either a master-slave or a peer-to-peer tandem configuration with the seat video display, and is designed so that the wireless network can be scaled to support the audio distribution needs of the system. The advantage of this approach is that, other than the complexity of the wireless receiver, the rest of the electronics in the receiver seat can be quite low cost and simple. Wireless technologies that have been shown to operate without EMI issues during flight should be utilized for the wireless network.

According to an embodiment of the present invention, an audio control (e.g., volume, bass, treble, balance, etc.), games controller, and options selection controller 262 may be coupled to the second transceiver 260 and may also wirelessly transmit such control information as audio volume between the (T)PCU and the earphone 106A, or transmit with the SVDU 200 in order to provide additional functionality, such as providing the controls for a game that is displayed on the SVDU 200, or to select various options for viewing, listening, playing, etc.

It should be noted that any or all of the components associated with the second network address 106, 106A, 242, 250, 260, 262, could constitute or be part of a portable component. This would allow passengers using the PCU some degree of mobility. The portable component could be paired with a cradle, and circuitry of the cradle could be used to provide an association between the portable component and the second network address and the first network address (and its associated SVDU). The portable component could either be the directly addressable component containing the wireless transceiver 260, or it could simply be wirelessly linked to the cradle in a one-to-one relationship where the cradle or connected component comprised the second wireless transceiver 260.

Advantageously, the use of the cradle with a portable component would also permit charging a battery of the portable component, and could also serve to permit an easy exchange of the portable component due to a failure on the part of the portable component or the availability of an upgrade.

According to an embodiment of the present invention, public address (PA) functions may be received. For example, low latency announcements may be received from the network and transmitted directly to the passenger earphone using a tandem wireless network.

The streaming source 112 provides multimedia or audio-visual data over the network to various subscribers. By way of the example, a user in the seat associated with Network Address B subscribes to a particular audio-visual media. Software associated with the IFE knows that the SVDU 108 associated with the user in the seat associated with Network Address B is located at Network Address A, and therefore directs the audio-visual data to the Network Address A. The combined audio-visual data is routed through the SEB 120 associated with Network Address A, where it is decoded by a decoder 210, such as an MPEG decoder for MPEG data. It should be noted that although the decoder 210, splitting, packetizing 234, and other functions are illustrated as being located in the SVDU 108, there is no requirement that the components associated with such functionality be physically located within the SVDU 108.

As illustrated, the decoder 210 splits the audio and video apart and directs the video to a video processor and display 109 associated with Network Address A. The audio data is sent to a component 234 that packetizes the audio for subsequent transmission wirelessly (via the first wireless transceiver 236) to Network Address B. As noted above, this information is preferably not compressed prior to transmission, but may be compressed if known engineering principles suggest that it would be advantageous to do so. As illustrated, a multiplexer 230 may be provided so that game or other audio data 220 can be properly packetized and transmitted over the network as well.

The packetized audio data may then be accessed by the second wireless receiver 260 at Network Address B, where a component 242 exists for combining the audio packets together. The combined audio data may be processed 250 and converted to analog from digital (the processing may occur via either or both of analog and digital processing) and then presented to the audio jack 106 for subsequent output to the headphones 106A.

Figure 5:
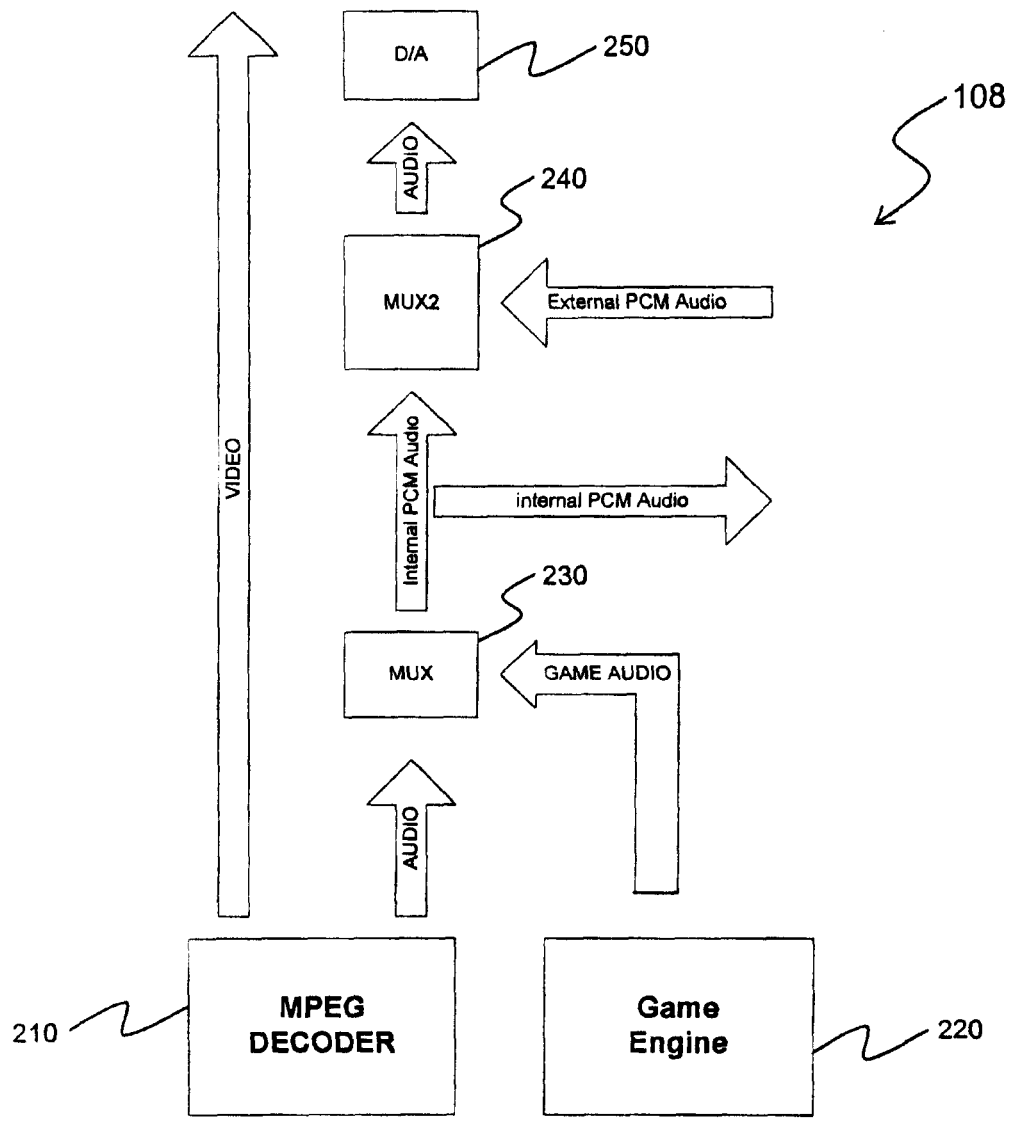
FIG. 5 is a block diagram illustrating the inclusion of game data and external audio.

FIG. 5 shows a detail view of an SVDU functional block 108. A first multiplexer MUX 230 may be used if audio from either the MPEG decoder 210 in a game engine 220 is available. A second multiplexer MUX2 240 may be required because in some cases (e.g., at the front row of seats), and the analog audio will be brought out of the SVDU 108 directly and then supplied to an audio D/A converter 250, which is connected to the audio jack 106 and headphones 106A.

Figure 6:
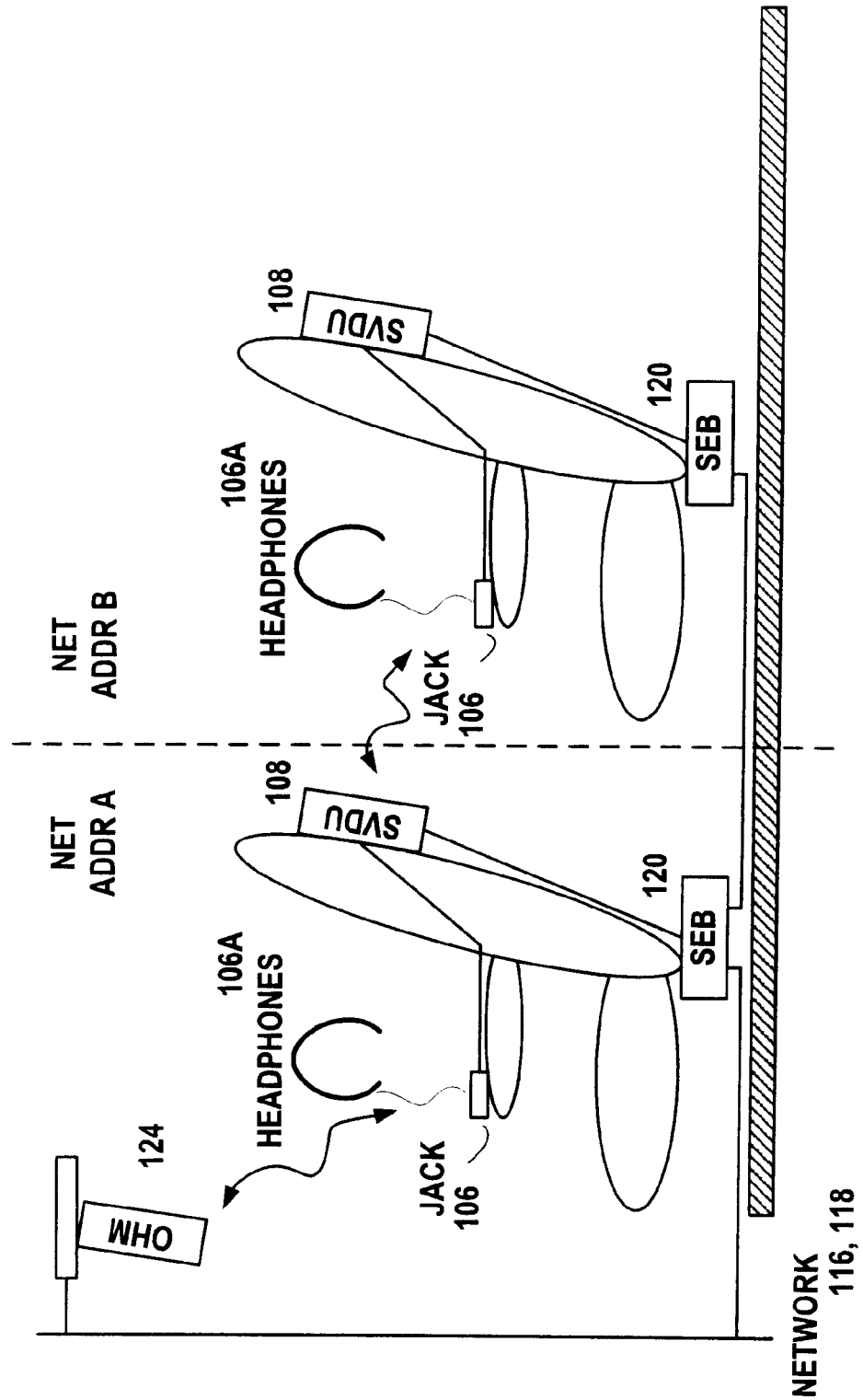
FIG. 6 is a pictorial schematic diagram illustrating the use of both an overhead and a seat video display unit.

FIG. 6 provides a hybrid pictorial and schematic layout of an embodiment of the inventive system. In FIG. 6, multimedia or audio-visual data is directed over the network 116, 118 to an SVDU 108 at Network Address A through the SEB 120. The audio information is split from the audio-visual data, packetized, and sent wirelessly to the seat behind it at Network Address B. Hardware associated with Network Address B then reassembles the audio data packet, performs a D/A conversion and processes the signal, and finally presents the analog audio signal to headphones 106A via the headphone jack 106.

The audio data associated with multimedia or audio-visual data sent to an overhead monitor (OHM) 124 can similarly be packetized and sent to one or more addresses associated with audio processing for those seats that are related to a particular OHM 124. A user of a particular seat associated with an address may still wish to subscribe to a particular audio content associated with the OHM 124, such as when (as noted above) a different language is desired by the user. Thus, the system permits a user to subscribe to audio and video content separately (for maximum flexibility), although the system could also be designed to permit a subscription only to audio and video that are tied together (less complexity).

Figure 7:
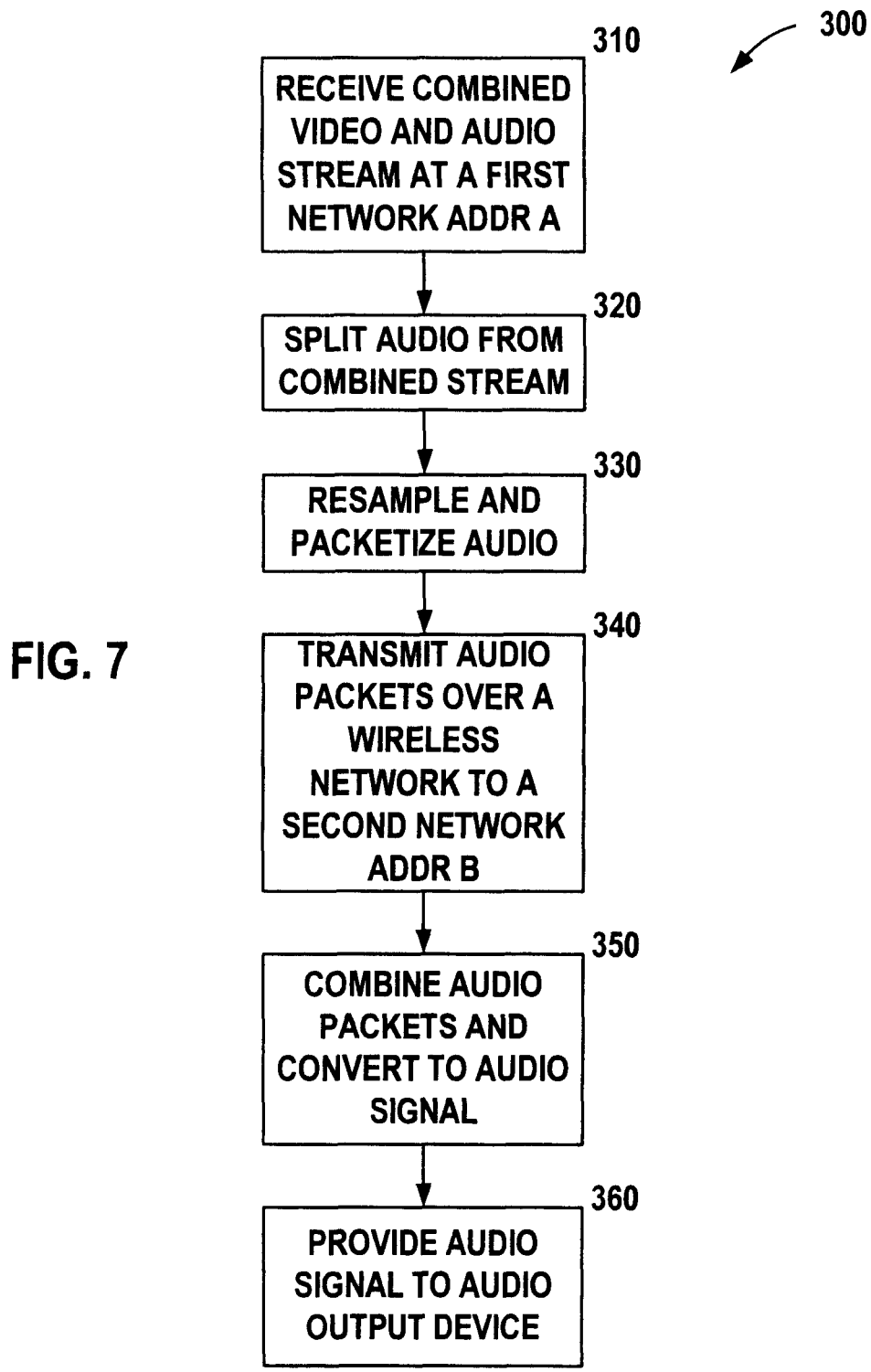
FIG. 7 is a flowchart illustrating operative aspects according to an embodiment of the invention.

FIG. 7 is a basic flowchart that illustrates the steps defined above, namely, that a combined audio and video stream is received by hardware at a first network address 310, and the audio is split 320 from this combined stream. The audio, if it is in analog form, is re-sampled and packetized 330 for subsequent transmission over a wireless network to a second network address 340. Components at the second network address combine the audio packets, process them, and produce an analog audio signal 350, which is then presented to an audio output device 360.

Embodiments of the present invention may provide a number of features and advantages, including locating the audio jack in the seat arm, thereby reducing physical contact/disturbance of the seatback from the passenger seated in the row behind. Moreover, this location is compatible with some manufacturing preferences and is consistent with possibly emerging seat wiring standards that could prohibit baseband audio feedback wiring from the seatback SVDU to the seat arm. According to embodiments of the present invention, it is also possible to maintain audio/video synchronization during both normal play and "trick" modes (e.g., search forward/reverse), and to also support the aircraft PA latency requirement, e.g., 35 milliseconds maximum between headset PA audio and that from the overhead speakers.

In sum, various embodiments of the present invention advantageously provide audio that is recovered from the MPEG decoder in the SVDU, and is re-sampled and packetized for wireless transmission from a first wireless transceiver associated with a first seat having an SVDU or an overhead display (i.e., the originating or source device) to a second wireless transceiver associated with audio receiving and processing, and entertainment controls of a passenger seat, thus permitting deletion of dedicated audio wiring from the seat back displays. Additionally, standard addressing techniques may be used to ensure that the audio packet arrives at the correct destination, and a dedicated decoder in receives the data and converts it to analog format for the headset.

Additionally, the present invention may also be used to distribute audio content associated with overhead video programs. In that case, the audio packets from an overhead monitor may be assembled as a multicast stream, to permit access by any interested passengers. The scheme may be expanded to permit multicast streams from different overhead monitors, for example, each one playing a different language track. In this way, a passenger would be able to select the language track desired. Thus, the present invention may also provide synchronized multi-language video and audio to in-seat headsets from overhead monitors.

For the purposes of promoting an understanding of the principles of the invention, reference has been made to the various embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The system may use any form of processor and comprise a memory, data storage, and user interface devices, such as a graphical display, keyboard, barcode, mouse, or any other known user input or output device. The system may also be connected to other systems over a network, such as the Internet, and may comprise interfaces for other devices. The software that runs on the system can be stored on a computer-readable media, such as tape, CD-ROM, DVD, or any other known media for program and data storage.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

The invention claimed is:

1. A wireless communication system for a vehicle including a plurality of seats, comprising:
   an overhead video display mounted to a ceiling of the vehicle;
   an electronic unit that is spaced apart from the seats and is configured to receive video content and audio content in a digital program stream, and comprises:
      a decoder that decodes the digital program stream into a video stream and a plurality of audio streams, wherein each of the plurality of audio streams contains a different language track associated with the video stream from the digital program stream, and the decoder provides the video stream to the overhead video display for display;
      a packetizer component that packetizes the plurality of audio streams; and
      at least one wireless transceiver that:
         receives a selection of a first one of the audio streams from a plurality of addresses of wireless transceivers of a first group of the plurality of seats, and transmits the packetized first audio stream as a first multicast stream addressed to the plurality of addresses of the wireless transceivers of the first group of the plurality of seats through a wireless packet communication interface, and
         receives a selection of a second one of the audio streams from a plurality of addresses of wireless transceivers of a second group of the plurality of seats, and transmits the packetized second audio stream as a second multicast stream addressed to the plurality of addresses of the wireless transceivers of the second group of the plurality of seats through the wireless packet communication interface.

2. The wireless communication system of claim 1, wherein:
   the at least one wireless transceiver transmits the packetized first audio stream through the first multicast stream addressed to the plurality of addresses of the wireless transceivers of the first group of the plurality of seats at a same time as transmitting the packetized second audio stream through the second multicast stream addressed to the plurality of addresses of the wireless transceivers of the second group of the plurality of seats.

3. The wireless communication system of claim 1, wherein:
   the overhead video display unit further comprises a video display that receives and displays the video stream for viewing by passengers located at the first and second groups of the plurality of seats.

4. The wireless communication system of claim 1, wherein:
   the at least one wireless transceiver identifies the plurality of addresses of the wireless transceivers of the first group of the plurality of seats for use in transmitting the first multicast stream responsive to separately receiving selection messages of the first one of the audio streams through the wireless packet communication interface from the wireless transceivers of the first group of the plurality of seats, and the at least one identifies the plurality of addresses of the wireless transceivers of the second group of the plurality of seats for use in transmitting the second multicast stream responsive to separately receiving selection messages of the second one of the audio streams through the wireless packet communication interface from the wireless transceivers of the second group of the plurality of seats.

5. A method of operating a wireless communications system for a vehicle including a plurality of seats, the method comprising:
   receiving a digital program stream containing video content and audio content;
   decoding the digital program stream into a video stream and a plurality of audio streams, wherein each of the plurality of audio streams contains a different language track associated with the video stream from the digital program stream;
   providing the video stream to an overhead video display mounted to a ceiling of the vehicle;
   packetizing the plurality of audio streams;
   receiving a selection of a first one of the audio streams from a plurality of addresses of wireless transceivers of a first group of the plurality of seats;
   transmitting the packetized first audio stream as a first multicast stream addressed to the plurality of addresses of the wireless transceivers of the first group of the plurality of seats through a wireless packet communication interface;
   receiving a selection of a second one of the audio streams from a plurality of addresses of wireless transceivers of a second group of the plurality of seats; and
   transmitting the packetized second audio stream as a second multicast stream addressed to the plurality of addresses of the wireless transceivers of the second group of the plurality of seats through the wireless packet communication interface.

6. The method of claim 5, further comprising:
   transmitting the packetized first audio stream through the first multicast stream addressed to the plurality of addresses of the wireless transceivers of the first group of the plurality of seats at a same time as transmitting the packetized second audio stream through the second multicast stream addressed to the plurality of addresses of the wireless transceivers of the second group of the plurality of seats.

7. The method of claim 5, further comprising:
providing the video stream to a video display video display mounted to a ceiling of the vehicle for viewing by passengers located at the first and second groups of the plurality of seats.

8. The method of claim 5, further comprising:
identifying the plurality of addresses of the wireless transceivers of the first group of the plurality of seats for use in transmitting the first multicast stream responsive to separately receiving selection messages of the first one of the audio streams through the wireless packet communication interface from the wireless transceivers of the first group of the plurality of seats; and
identifying the plurality of addresses of the wireless transceivers of the second group of the plurality of seats for use in transmitting the second multicast stream responsive to separately receiving selection messages of the second one of the audio streams through the wireless packet communication interface from the wireless transceivers of the second group of the plurality of seats.

* * * * *

UNITED STATES PATENT AND TRADEMARK OFFICE
CERTIFICATE OF CORRECTION

PATENT NO.       : 8,635,654 B2
APPLICATION NO.  : 12/110487
DATED            : January 21, 2014
INVENTOR(S)      : Correa et al.

Page 1 of 1

It is certified that error appears in the above-identified patent and that said Letters Patent is hereby corrected as shown below:

On Title Page:
Item 60, Related U.S. Application Data: Replace the entire sentence to read as follows:

-- Provisional application No. 60/924,102, filed on April 30, 2007, provisional application No. 60/924,103, filed on April 30, 2007. --

In the Claims:
Column 9, Claim 7, Lines 2 and 3: Replace "stream to a video display video display mounted to a ceiling" to read -- stream to a video display of the overhead video display mounted to a ceiling --

Signed and Sealed this
Seventh Day of October, 2014

Michelle K. Lee
*Deputy Director of the United States Patent and Trademark Office*